United States Patent [19]

Davidovitch

[11] Patent Number: 5,058,016
[45] Date of Patent: Oct. 15, 1991

[54] COMPUTERIZED ELECTRICAL VEHICLE

[76] Inventor: Jecheskel Davidovitch, 22 Avtalion Street, Ramat Gan 52424, Israel

[21] Appl. No.: 565,891

[22] Filed: Aug. 9, 1990

Related U.S. Application Data

[63] Continuation of Ser. No. 267,021, Nov. 4, 1988, abandoned.

[30] Foreign Application Priority Data

Nov. 5, 1987 [IL] Israel ........................ 84382

[51] Int. Cl.⁵ .................. G06F 15/50; B62D 11/04
[52] U.S. Cl. .................. 364/424.01; 180/6.5; 364/424.05
[58] Field of Search .......... 364/424.02, 424.01, 364/424.05; 318/587; 180/6.2, 6.48, 6.5

[56] References Cited

U.S. PATENT DOCUMENTS

| | | | |
|---|---|---|---|
| 1,076,652 | 10/1913 | Hoffmann | 180/65.1 |
| 3,245,493 | 4/1966 | Barrett | 180/168 |
| 3,563,327 | 2/1971 | Mier | 180/169 |
| 4,227,595 | 10/1980 | Hamada | 180/167 |
| 4,395,186 | 7/1983 | Whyte | 180/65.5 |
| 4,541,051 | 9/1985 | Jarret et al. | 364/424.01 |
| 4,793,630 | 12/1988 | Schuit | 280/688 |
| 4,914,592 | 4/1990 | Callahan et al. | 364/424.05 |

FOREIGN PATENT DOCUMENTS

| | | | |
|---|---|---|---|
| 104421 | 6/1985 | Japan | 180/167 |
| 454464 | 10/1936 | United Kingdom | 180/65.5 |

*Primary Examiner*—Parshotam S. Lall
*Assistant Examiner*—Michael Zanelli
*Attorney, Agent, or Firm*—Edwin D. Schindler

[57] ABSTRACT

An electrical vehicle for road or internal transportation, in which all driving performances are carried out merely by controlling the relative rotation speeds and tilt-angle of each driving wheel, through a programmable control system, thus eliminating any mechanical means regularly utilized for this purpose, and enabling this vehicle to be driven by a person, or automatically along guiding elements, or by remote control, or to be programmed for travelling along a predetermined course without any external guiding measures.

8 Claims, 5 Drawing Sheets

COMPUTERIZED ELECTRICAL VEHICLE

This application is a continuation of application Ser. No. 07/267,021, filed Nov. 4, 1988, now abandoned.

This invention relates to an electrical vehicle for road or internal transportation, being driven automatically, or by a person from the inside, or by remote control, including at least one pair of driven wheels, each tiltable about a substantially vertical pivot or two pivots, all driving performances, as steering, accelerating, slowing down, braking and reversing, being carried out by means of a programmable control system, directly controlling the relative rotation speed and tiltangle of each driven wheel separately, thus eliminating any mechanical means which regularly serve for driving performances in motor cars, except for one rod pivotedly interconnecting each pair of tiltable driven wheels, and except for one or more hand or foot control devices, or of any type, being incorporated when the vehicle is to be person driven from inside it. The invention is particularly but not exclusively concerned with electrical vehicles, as for example electrical motor cars for transportation of persons and goods on roads, or within areas prevented from use by regular motor cars, or electrical vehicles or trolleys within hospitals or within sites or areas which are restricted to other internal transportation, or vehicles for automatic conveying systems in industrial plants, stores or the like.

Automated guided vehicles are known for a long time, but regularly include steering mechanisms operated by servo motors, which due to their structure are not suitable for road transportation like regular motor cars.

It is the object of the present invention to provide a new and simple electrical vehicle, for road or other transportation, which is also suitable for being operated by automatic or remote control, having a relatively small number of parts, and being low in cost and in current expenses, simple in maintenance and safe to passengers.

In one of its broadest aspects, the new electrical vehicle comprises a chassis, and at least one pair of driven wheels, tiltable about a substantially vertical pivot, or two pivots, being excentrical to the vertical center of the wheel (as common in the front wheels of conventional motor cars and as illustrated in FIG. 5 of the accompanying drawing figures).

The one pair of opposite pivots in the tiltable driven wheels, are fixed two short arms, interconnected pivotedly by a connecting rod. Both short arms together with the connecting rod, ascribe substantially a trapezoid, so as to assist in maintaining the correct relative tilt angles of the tiltable driven wheels, for each possible curvature of track to be followed by the vehicle, said connecting rod serving also for transferring the driving torque from the tiltable driven wheels to the chassis.

Each driven wheel incorporates a built-in electrical motor, and at least in one pair of driven wheels (but possibly in more), each wheel incorporates a braking unit, such as an electromagnetic brake of the known type, or any other kind.

The new electrical vehicle also comprises an electrical battery, a computerized or any other programmable control system, a power supply, sensing or measuring elements, a wiring system which may be a regular one or of a rigid type, or built into the vehicle parts (as the battery body, control system, chassis or seats), one or more driving control units in form of a joy stick or a handle or a wheel, or a pedal, or any other kind. The vehicle may also comprise a body, bumpers, and other typical motor car accessories. The structure and location of the wheels in this vehicle, enable it to be driven on external roads, like any conventional motor car, whereas the known types of "automated guided vehicles" are usually intended for internal transportation only, or to well prepared sites.

The steering of the vehicle is performed by changing the relative rotation speeds of the driven wheels thus causing their tilt by utilizing the friction power between the wheels and the ground. The changes of these speeds are programmed for obtaining tilt angles of the wheels, as required for each track curvature. Quick slowdown of wheel speeds, if required for the steering, may also be helped by automatic controlled braking operations.

The regulating of the relative wheel speeds, the accelerating, the slowing down and the reversing operations, are all performed by means of speed regulating units, controlled by said control system. The braking operation is also controlled by the control system, for synchronization with the slowing down, and for optimal braking characteristics. Any mechanical means which usually serve for all these driving performances in a conventional motor car, can thus be eliminated except for said connecting rods and one or more hand- or foot driving control units.

The driving of the vehicle can be automatic by remote control or by means of guiding elements, which may be followed with the help of a sensing unit mounted into the vehicle, the position of this unit in relation to the guiding element, being continuously fed back to the programmable control system, for course rectification.

Automatic driving can also be programmed along a predetermined course, without any external guiding measures.

The vehicle can be person-driven from the inside, as in conventional cars, by means of one or more driving control units, to be operated by hand or by foot, or in any other way.

In a practical embodiment of the invention, the electrical vehicle comprises a chassis, four driven wheels, each incorporating a built-in electrical motor, the stator of which being mounted into a housing, which incorporates at its center a shaft. On this shaft is rotatably mounted, by means of two tapered bearings, a hub, on the outer diameter of which is mounted a permanent magnet rotor of said electrical motor. Inside said housing is fixedly mounted the stationary part of an electromagnetic brake unit, forming the magnetic element. Facing said stationary part, is concentrically mounted on a spline seating of said hub, the rotatable ring of the brake unit, (named: "armature"), being free to slide along said spline, to contact the magnetic element when actuated. At the opposite side of said hub, is mounted by means of screws the rim, on which the tire is mounted. Said motor housing incorporates the protrusions, into which are fixedly mounted two pivots of a common axis, intended for the wheel to swivel about, the lower pivot incorporating at its upper end a square portion, for a short arm to be fixed thereon. At the other end of each short arm, is fixedly mounted a pin, protruding upwards.

A connecting rod, incorporating two bores with bushings at both ends, is pivotedly mounted on the upwards protruding pins of the opposite arms, at a configuration as required for ensuring the correct relative tilt angles of the wheels.

In the assembled vehicle, all four wheels are mounted on the chassis, having the pins of each wheel inserted into a pair of bushings, attached to the chassis in line on top of each other, two pairs on each side. Close to those bushings are incorporated openings in the chassis frame for said arms to pass through. The electrical battery is located on the chassis so as to have the full load of the vehicle distributed evenly upon the four wheels. The housing of the whole control system is attached to the rear side of the battery, and two seats are located above both.

The electrical wiring is of the rigid type, built partially into the chassis frame, and partially into the battery housing and seats, all these items being interconnected by socket connections, for forming the whole electrical and electronical circuits of the power and control systems. The contacts with the electrical motors and with the electromagnetic brake units, lead through said four pairs of bushings attached to the chassis, and through said pivots of the wheels, forming rotative electrical contacts. A rigid cover for the battery and control system housing is fitted into the chassis, incorporating suitable holes, for the socket connection between the seats and the control system to pass through. Each seat incorporates a driving control unit, being operated by a joystick which is inserted into said unit. This driving stick can be transferred from one seat to the other, for any of the passengers to drive the vehicle, without changing seats. Alternatively, a driving control unit can be located between the seats.

The vehicle body forms one solid envelope, preferably transparent all around, but at least at its front portion, and is fitted into the chassis and into both bumpers, thus assisting in transferring part of the hit energy to the opposite bumper, and also to absorb part of that energy, due to its elasticity. The body also incorporates clearances for the wheels to be swiveled according to the steering requirements, and wide openings on each side, for the approach of persons into and out of the vehicle. Doors can be mounted in the body, for closing these openings if desired. Bumpers can also be attached to the chassis from all sides. These bumpers may be, at least partially, of transparent material, incorporating lighting fixtures, which would thus be protected against breakage.

All the vehicle parts so far mentioned, can be safely interconnected by snap-connection or by inserting into each other, so as to eliminate the need for any of the known joints like screws, nuts or clips, and for the tools required for these joints, except for the wheel units which, for this purpose are regarded as not dismantlable, but exchangeable only. The driving operation is controlled by the driver, by means of said joy stick, performing the steering operation by corresponding motions to the right and to the left, the accelerating-by motions from the center forwards, and the reversing-by motions from the center rearwards. With the stick at the center, the motor will stop, and the electromagnetic brake will be actuated, according to the braking programme.

For automatic driving along a guiding element, a sensing unit is mounted underneath the chassis, to follow said element by feeding back to the control system the deviation data, for course rectification.

As mentioned before, this vehicle can also be driven by remote control or be programmed for automatic travelling along a predetermined course, thus eliminating any external guiding measures. The automatic guiding feature in this vehicle, enables it also to be automatically guided within a battery charging terminal, which includes a series of automatic continuous charging lanes, each one for a predetermined charging level, the vehicle being automatically directed to the suitable lane, according to the discharge level of its battery, reaching fully charged to the other end of the terminal, ready to be taken.

These and further features of the invention will become apparent from the following detailed description which has references to the annexed drawings, in which.

Figure 1:
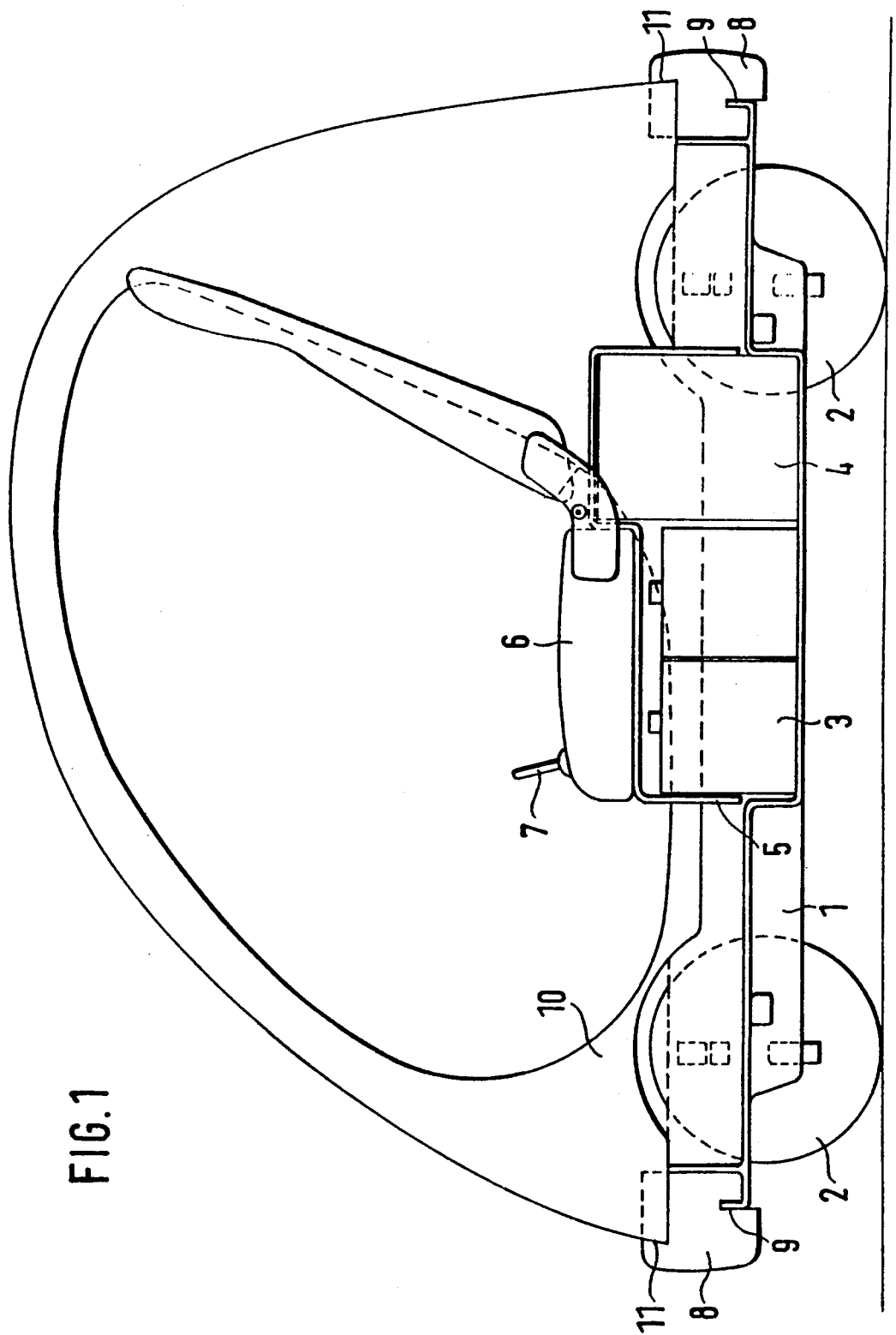
FIG. 1 is an elevational section of the new vehicle.

As can be seen in FIG. 1, an electrical vehicle in accordance with the present invention, comprises basically, a chassis 1; four driven wheel units 2; two batteries 3; a complete programmable control system accommodated in a housing 4; the two batteries and the control system housing being located in a recess formed at the center of chassis 1 and covered by cover 5 which is fitted into chassis 1. On top of cover 5, are positioned two foldable seats 6, between which is located a built-in driving control unit (not seen), into which is inserted a joy stick 7. Front and rear bumpers 8 are fastened onto the front and rear ends of chassis 1, by slots at the bottom of the bumpers being forced onto upright folds 9, at the ends of chassis 1. Vehicle body 10 is fitted on both sides to chassis 1, and at its front and rear ends into sloped recess 11, incorporated in bumpers 8, thus transferring a hit energy to both bumpers simultaneously.

It can be seen in FIG. 1, that in this configuration, a relatively large space is maintained for luggage behind the seats. The passengers compartment, on the other hand, is completely free of any accessories or protrusions, as handles, levers, steering wheel, gauges, etc., thus avoiding any danger or injury by them. Nor can the passengers' head be frontally hit, due to the gradual sloping down of the vehicle body 10. In other words, this vehicle is far safer for the passengers, as compared to conventional cars because of its structure and configuration.

The number of dismantlable parts this vehicle has, as can be seen is relatively small, its erecting and dismantling is easy and quick, and joints or tools for these purposes are completely eliminated, regarding the wheel unit exchangeable as a whole.

Figure 2:
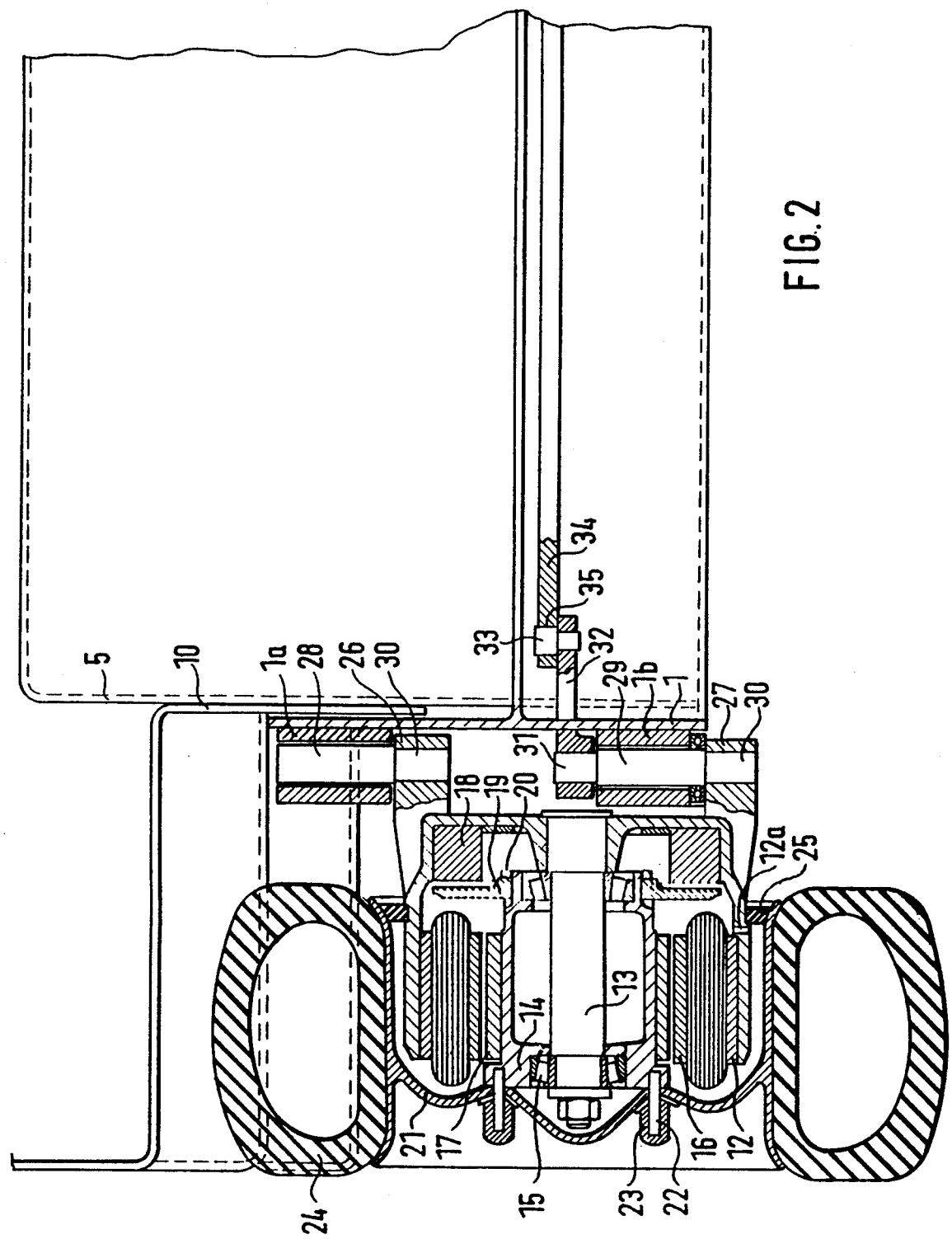
FIG. 2 is a cross-sectional view of the wheel unit taken along section line A—A' of FIG. 1.

Turning to FIG. 2, as taken along section line A—A' of FIG. 1, each wheel unit, as can be seen incorporates a built-in electric motor, the stator unit 16 being mounted into a motor housing 12, incorporating at its center a shaft 13, on which is rotatably mounted the wheel hub 14, by means of two tapered roller bearings 15 incorporated at both ends of hub 14. The rotor 17 includes a permanent magnet, is mounted on the outer diameter of hub 14, being located opposite stator unit 16. As can be seen, an electromagnetic brake unit is accommodated inside motor housing 12, to which the magnet element 18, forming the stationary part of the braking unit, is fixedly attached, the rotatable ring 19 of said braking unit, being mounted at the end hub 14, in a spline seating 20, free to slide towards the magnet element 18 when actuated.

At the outer side of hub 14 is mounted the rim 21, by means of studbolts 22 and nuts 23, tire 24 being mounted on the outer periphery of rim 21.

The stator unit 16 is varnish insulated against penetration of water, and so is magnet element 18 of the braking unit.

A gasket 25, fixed to the outer periphery of motor housing 12, is slidewise fitted to the internal periphery of rim 21 so as to prevent the penetration of foreign bodies, dirt and water splashes into the wheel unit. At the bottom of motor housing 12, between the stator unit 16 and gasket 25, a hole 12a can be provided for the release of occasionally trapped liquids.

As can be seen, two protrusions 26 and 27 form one part with the motor housing 12 and incorporate fixedly one pivot each, by means of a square bottom portion 30. Pivot 29 incorporates a square upper portion 31, for arm 32 to be mounted fixedly thereto, both pivots 28 and 29 inserted into bushings 1a and 1b. Arm 32 incorporates at its other end, a pin 33 which protrudes upwardly. On each pair of opposite arms 32, is pivotally mounted a connecting rod 34 incorporating two bores with bushings 35 at both ends.

Figure 3:
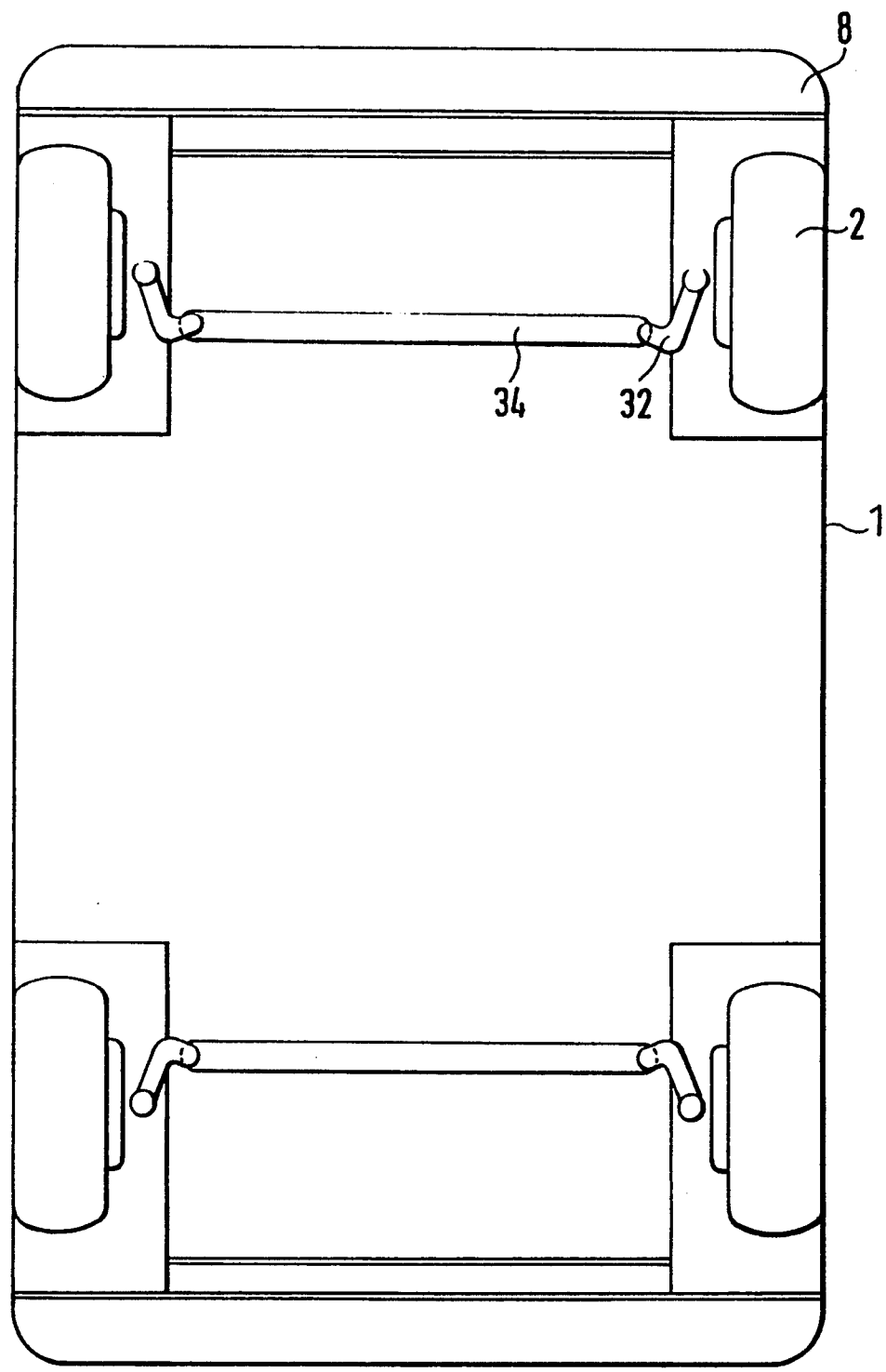
FIG. 3 is an underneath view of the new vehicle.

Turning to FIG. 3, each connecting rod 34, combined with two arms 32 as can be seen, form a geometric formation so as to maintain relative tilt angles of each pair of wheels, as required for the steering performance at the whole possible range of turning radii. It can also be seen that arms 32 are "L" shaped to enable their penetration into the chassis side-walls through the smallest possible openings.

It can be realized, that by having both pairs of wheels in the vehicle tiltable, smaller tilt angles of each wheel are required for the same turning radii, as compared to conventional cars, in which only the front wheels are tilted for steering.

Figure 4:
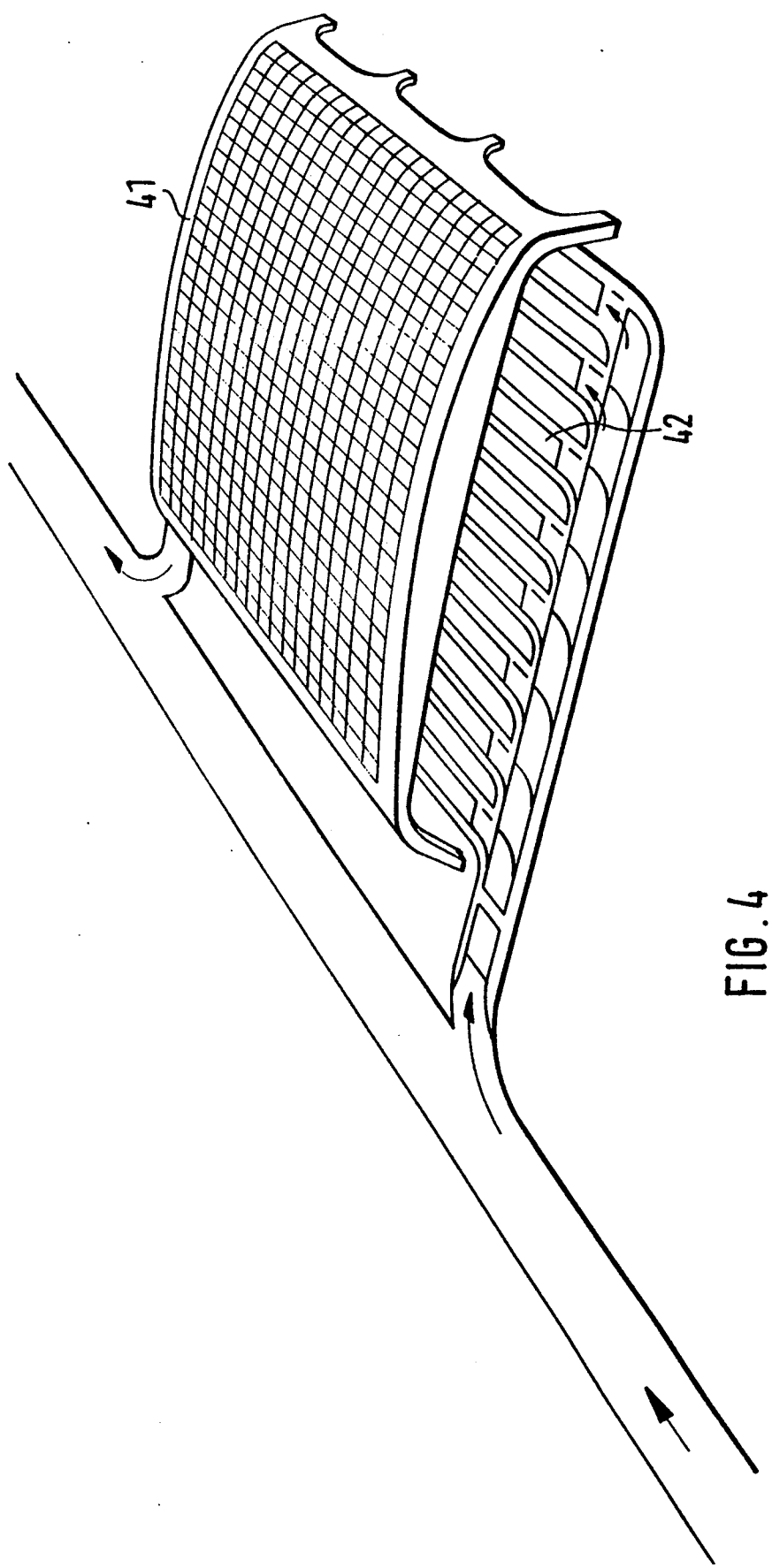
FIG. 4 is a general view of an automatic charging terminal, with a roof of solar cells; and, FIG. 5 is a schematic top view of a driven wheel for clarification of the tilting operation of said wheel.

In FIG. 4, a battery charging terminal 41 is illustrated, including a series of automatic continuous charging lanes 42, arranged in parallel, intended each for a different charging level, the vehicle being automatically directed to the suitable lane, in accordance with the discharge level of its battery.

Figure 5:
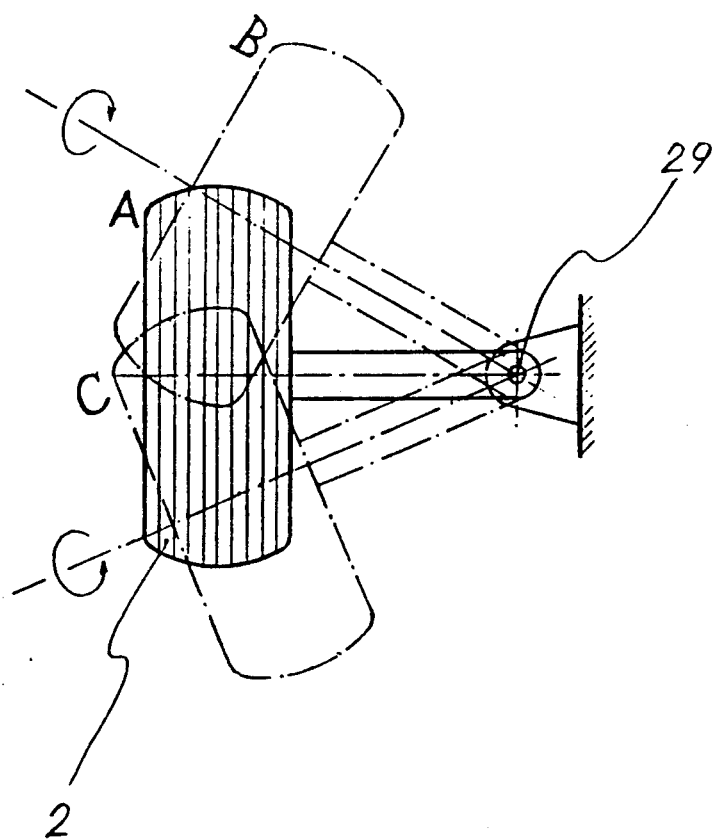

In FIG. 5, a schematic top view of a driven wheel is illustrated for clarifying the tilting operation of the wheel.

As can be seen, the wheel 2 is tiltable about pivot 29. When being in touch with the ground, the rotation of the wheel will cause its tilting from position "A" to "B," or from position "A" to "C," depending upon the rotation direction. The wheel tilting is affected by utilizing the friction power between the wheel and the ground.

This principle is applied, as well, for the vehicle in motion, said tilting occurring when differential rotational speeds are imparted to a pair of opposite driven wheels.

I claim:

1. An electrical vehicle with steering-by-driving for road or internal transportation, comprising:
   at least one pair of driven wheels, each wheel of said pair of driven wheels being tiltable about a substantially vertical pivot which is excentrical to the vertical center of said wheel and steerable by means for imparting and varying relative rotational speeds between said pair of driven wheels;
   a programmable control system for imparting and varying said relative rotational speeds to said pair of driven wheels;
   a chassis to which said tiltable driven wheels are attached; and,
   means for transferring a driving torque from at least one pair of said tiltable driven wheels to said chassis of said electrical vehicle, said means for transferring including at least one pair of arms, each of said arms being attached to each wheel of said pair of driven wheels, and at least one connecting rod pivotedly interconnecting each said pair of arms at a trapezoidal formation.

2. The electrical vehicle according to claim 1, wherein each of said driven wheel pairs includes a built-in electrical motor and an electromagnetic brake unit, said electrical motor and said electromagnetic brake unit being protected from penetration of liquids, each of said driven wheel pairs being separately controllable through said programmable control system for rotational speeds, rotational direction and braking characteristics, a steering operation being effected by utilizing friction power between wheels and ground.

3. The electrical vehicle according to claim 1, further comprising means for an automatic controlled braking of said vehicle.

4. The electrical vehicle according to claim 1, wherein said electrical vehicle has four tiltable independently driven wheel units.

5. An electrical vehicle with steering-by-driving for road or internal transportation, comprising:
   two pairs of driven wheels, each wheel of said two pairs of driven wheels being tiltable about a substantially vertical pivot which is excentrical to the vertical center of said wheel and steerable by means for imparting and varying relative rotational speeds to said two pairs of driven wheels;
   a programmable control system for imparting and varying said relative rotational speeds to said two pairs of driven wheels;
   a chassis to which said two pairs of tiltable driven wheels are attached; and,
   means for transferring a driving torque from said two pairs of tiltable driven wheels to said chassis of said electrical vehicle, said means for transferring including two pairs of arms, each of said arms being attached to each wheel of said two pairs of driven wheels, and two connecting rods, each pivotedly interconnecting one pair of two said pairs of arms at a trapezoidal formation.

6. The electrical vehicle according to claim 5, further comprising means for an automatic controlled braking of said vehicle.

7. The electrical vehicle according to claim 5, wherein said electrical vehicle has four tiltable independently driven wheel units.

8. The electrical vehicle according to claim 5, wherein each of said driven wheels includes a built-in electrical motor and an electromagnetic brake unit, said electrical motor and said electromagnetic brake unit being protected from penetration of liquids, each of said driven wheels being separately controllable through said programmable control system for rotational speeds, rotation direction and braking functions, a steering operation being affected by utilizing the friction power between said driven wheels and ground.

* * * * *